United States Patent
Engelfried et al.

(10) Patent No.: US 10,350,782 B2
(45) Date of Patent: Jul. 16, 2019

(54) METHOD FOR PRODUCING AT LEAST ONE CUTTING UNIT SEGMENT OF A CUTTING UNIT OF A MACHINE TOOL SEPARATING DEVICE

(71) Applicants: Uwe Engelfried, Ostfildern (DE); Milan Bozic, Solothurn (CH); Petr Grulich, Kirchheim/Teck (DE)

(72) Inventors: Uwe Engelfried, Ostfildern (DE); Milan Bozic, Solothurn (CH); Petr Grulich, Kirchheim/Teck (DE)

(73) Assignee: Robert Bosch GmbH, Stuttgart (DE)

( * ) Notice: Subject to any disclaimer, the term of this patent is extended or adjusted under 35 U.S.C. 154(b) by 77 days.

(21) Appl. No.: 14/382,420

(22) PCT Filed: Jan. 4, 2013

(86) PCT No.: PCT/EP2013/050107
§ 371 (c)(1),
(2) Date: Sep. 2, 2014

(87) PCT Pub. No.: WO2013/127543
PCT Pub. Date: Sep. 6, 2013

(65) Prior Publication Data
US 2015/0122102 A1 May 7, 2015

(30) Foreign Application Priority Data
Mar. 2, 2012 (DE) .................. 10 2012 004 049

(51) Int. Cl.
*B23D 65/00* (2006.01)
*B23D 65/02* (2006.01)
(Continued)

(52) U.S. Cl.
CPC ............ *B27B 33/142* (2013.01); *B21K 23/00* (2013.01); *B23D 65/00* (2013.01); *B23D 65/02* (2013.01); *Y10T 83/707* (2015.04); *Y10T 83/909* (2015.04)

(58) Field of Classification Search
CPC ... Y10T 83/909; Y10T 83/913; Y10T 83/917; Y10T 83/921; Y10T 83/925;
(Continued)

(56) References Cited

U.S. PATENT DOCUMENTS

| | | | |
|---|---|---|---|
| 614,003 A | * 11/1898 | Johnson | B23D 53/02 83/820 |
| 1,178,362 A | 4/1916 | Wall | |

(Continued)

FOREIGN PATENT DOCUMENTS

| | | |
|---|---|---|
| CH | 272660 | 12/1950 |
| CN | 101417449 A | 4/2009 |

(Continued)

OTHER PUBLICATIONS

DE814787 English Translation; Rudolf Raible; B27B33/14; Sep. 27, 1951.*

(Continued)

*Primary Examiner* — Laura M Lee
(74) *Attorney, Agent, or Firm* — Maginot, Moore & Beck LLP (57) ABSTRACT

A method for producing a cutting unit segment of a cutting unit of a machine tool separating device, includes at least one cutter support element and at least one cutter element. In at least one step, the cutter element is molded on the cutter support element by a drawing process in an at least partially staggered manner relative to an outer surface of the cutter support element.

7 Claims, 4 Drawing Sheets

(51) Int. Cl.
*B27B 33/14* (2006.01)
*B21K 23/00* (2006.01)

(58) Field of Classification Search
CPC .......... B27B 33/142–145; B23D 65/00; B23D 65/02; B23D 65/04
USPC ........... 83/830–834, 788–820; 76/25.1–80.5; 30/381–387; 72/379.2
See application file for complete search history.

(56) References Cited

U.S. PATENT DOCUMENTS

| | | | | |
|---|---|---|---|---|
| 1,655,856 | A * | 1/1928 | Bens | B27B 33/14 83/832 |
| 2,204,344 | A * | 6/1940 | Doberstein | E21C 25/36 299/84.1 |
| 2,605,788 | A | 8/1952 | Reid | |
| 2,798,517 | A * | 7/1957 | Carney | B27B 33/144 83/830 |
| 2,891,586 | A * | 6/1959 | Wright | B27B 17/02 30/383 |
| 3,228,437 | A * | 1/1966 | Wezel | A22B 5/206 83/830 |
| 3,696,692 | A * | 10/1972 | Baranowski | B23D 65/00 76/112 |
| 3,837,241 | A * | 9/1974 | Weiss | B23D 65/02 72/403 |
| 3,910,147 | A | 10/1975 | Heyerdahl | |
| 4,309,931 | A * | 1/1982 | Alexander | B27B 17/02 83/830 |
| 4,382,334 | A * | 5/1983 | Reynolds | B23D 63/168 144/73 |
| 4,535,667 | A * | 8/1985 | Gibson | B23D 63/168 76/80.5 |
| 4,554,853 | A | 11/1985 | Nitschmann et al. | |
| 4,785,700 | A * | 11/1988 | Petrovich | B23D 63/162 83/830 |
| 4,901,613 | A | 2/1990 | Carlton | |
| 5,029,501 | A * | 7/1991 | Smith | B27B 33/142 83/13 |
| 5,226,404 | A * | 7/1993 | Mogi | B27B 17/08 125/21 |
| 5,988,035 | A * | 11/1999 | Rossmann | B27B 33/14 83/830 |
| 6,223,640 | B1 * | 5/2001 | Sundstrom | B27B 33/14 30/383 |
| 6,871,573 | B2 * | 3/2005 | Mang | B27B 33/141 83/830 |
| 9,962,854 | B2 * | 5/2018 | Hug | B27B 33/142 |
| 2010/0224047 | A1 * | 9/2010 | Prodinger | B27B 33/14 83/830 |
| 2015/0013173 | A1 * | 1/2015 | Hug | B27B 33/142 30/383 |
| 2015/0122102 | A1 * | 5/2015 | Engelfried | B27B 33/142 83/788 |

FOREIGN PATENT DOCUMENTS

| | | |
|---|---|---|
| DE | 405742 | 11/1924 |
| DE | 419108 | 9/1925 |
| DE | 814 787 | 9/1951 |
| DE | 814 938 | 9/1951 |
| DE | 42 37 781 A1 | 5/1994 |
| DE | 43 16 145 A1 | 11/1994 |
| EP | 0 204 610 A1 | 12/1986 |
| EP | 423 501 A2 | 4/1991 |
| IT | 01241918 B | 2/1994 |

OTHER PUBLICATIONS

DE405742 Arvid Lind; B27B33/14; Nov. 6, 1924.*
International Search Report corresponding to PCT Application No. PCT/EP2013/050107, dated Mar. 26, 2013 (German and English language document) (5 pages).

* cited by examiner

METHOD FOR PRODUCING AT LEAST ONE CUTTING UNIT SEGMENT OF A CUTTING UNIT OF A MACHINE TOOL SEPARATING DEVICE

This application is a 35 U.S.C. § 371 National Stage Application of PCT/EP2013/050107, filed on Jan. 4, 2013, which claims the benefit of priority to Serial No. DE 10 2012 004 049.0, filed on Mar. 2, 2012 in Germany, the disclosures of which are incorporated herein by reference in their entirety.

BACKGROUND

Methods for producing a cutting strand segment of a cutting strand of a power-tool parting device, wherein the cutting strand segment comprises a cutter carrier element and a cutting element, are already known.

SUMMARY

The disclosure is based on a method for producing at least one cutting strand segment of a cutting strand of a power-tool parting device, said cutting strand segment comprising at least one cutter carrier element and at least one cutting element.

It is proposed that, in at least one step, the cutting element is integrally formed on the cutter carrier element in an at least partially set manner relative to an outer surface of the cutter carrier element by tensile forming. A "cutting strand segment" should be understood here as meaning in particular a segment of a cutting strand, said segment being intended to be connected to further segments of the cutting strand in order to form the cutting strand. Preferably, the cutting strand segment is in the form of a chain link which is connected to further cutting strand segments in the form of chain links in order to form the cutting strand, which is preferably in the form of a cutting chain. A "cutting strand" should be understood here as meaning in particular a unit composed of cutting strand segments, said unit being intended to locally undo atomic cohesion of a workpiece to be machined, in particular by means of a mechanical parting-off process and/or by means of mechanical removal of material particles of the workpiece. Preferably, the cutting strand is intended to separate the workpiece into at least two physically separate parts and/or to at least partially part off and/or remove material particles of the workpiece starting from a surface of the workpiece. The cutting strand is particularly preferably in the form of a cutting chain. In this case, the cutting strand segments can be connected together detachably, for example by means of a chain joint etc., and/or non-detachably. However, it is also conceivable for the cutting strand to be in the form of a cutting band and/or cutting line. When the cutting strand is in the form of a cutting band and/or cutting line, the cutting strand segments are fixed directly to the cutting band and/or to the cutting line. The cutting strand segments can in this case be arranged on the cutting band and/or on the cutting line in a manner spaced apart from one another and/or in direct contact with one another.

A "cutter carrier element" should be understood here as meaning in particular an element to which at least one cutting element for parting off and/or for removing material particles of a workpiece to be machined is fixed. Preferably, the cutter carrier element is connected cohesively to the cutting element. Particularly preferably, the cutting element is formed integrally with the cutter carrier element. The expression "integrally" should be understood in particular as meaning formed in one piece, for example by being produced from a casting and/or by being produced in a single-component or multi-component injection-molding process, and advantageously from a single blank, for example a punching blank. In this case, the cutting element can be in the form of a half chisel tooth, of a full chisel tooth, of a "scratcher" tooth etc. However, it is also conceivable for the cutting element to have some other tooth shape that appears appropriate to a person skilled in the art. By means of the method according to the disclosure, a mechanically stable connection can be achieved in particular in a transition region between the cutting element and the cutter carrier element. In addition, the cutting element and the cutter carrier element can be formed advantageously from one blank. As a result, assembly outlay and costs can particularly advantageously be saved.

Furthermore, it is proposed that the cutting element is integrally formed on the cutter carrier element in an at least partially set manner relative to the outer surface of the cutter carrier element by embossing. However, it is also conceivable for the cutting element to be integrally formed on the cutter carrier element by some other tensile forming method that appears appropriate to a person skilled in the art. Preferably, the outer surface of the cutter carrier element extends at least substantially parallel to a cutting plane of the cutting strand. The expression "cutting plane" is intended here in particular to define a plane in which the cutting strand is moved, in at least one operating state, around a circumference of the guide unit in at least two cutting directions, directed in opposite directions to one another, relative to a guide unit of the power-tool parting device. Preferably, when a workpiece is machined, the cutting plane is oriented at least substantially transversely to a workpiece surface to be machined.

A "cutting direction" should be understood here as meaning in particular a direction in which the cutting strand is moved in order to create a cutting gap and/or to part off and/or to remove material particles from a workpiece to be machined in at least one operating state as a result of a drive force and/or a drive torque, in particular in the guide unit. Preferably, in one operating state, the cutting strand is moved in the cutting direction relative to the guide unit. The expression "at least substantially transversely" should be understood here as meaning in particular an orientation of a plane and/or a direction relative to a further plane and/or a further direction which preferably deviates from a parallel orientation of the plane and/or the direction relative to the further plane and/or the further direction. However, it is also conceivable for the cutting plane to be oriented, when a workpiece is machined, at least substantially parallel to a workpiece surface to be machined, in particular when the cutting strand is in the form of a grinding means etc. The expression "at least substantially parallel" should be understood here as meaning in particular an orientation of a direction relative to a reference direction, in particular in a plane, wherein the direction has a deviation in particular of less than 8°, advantageously less than 5° and particularly advantageously less than 2° with respect to the reference direction. By means of embossing, the cutting element can be integrally formed advantageously in a cost-effective manner on the cutter carrier element. In addition, disruptive contours can advantageously be avoided or kept to a minimum on the cutting elements during production.

Furthermore, it is proposed that, in at least one step, a transverse securing element is integrally formed on the cutter carrier element by tensile forming. Preferably, the transverse securing element is integrally formed on a connecting element of the cutting strand, said connecting element being formed integrally with the cutter carrier element. Advantageously, the transverse securing element is integrally formed on the cutter carrier element by embossing. However, it is also conceivable for the transverse securing element to be integrally formed on the cutter carrier element by some other method that appears appropriate to a person skilled in the art, for example by compression forming etc. A "transverse securing element" should be understood here as meaning in particular an element which, as a result of a form fit and/or as a result of a force fit, to secure a movement along a transverse axis which extends at least substantially perpendicularly to the cutting plane of the cutting strand. Preferably, the transverse securing element is formed differently than a rivet head or a screw head. Preferably, the transverse securing element is intended to secure or limit a transverse movement by means of a form fit. However, it is also conceivable for the transverse securing element to be intended to at least secure or limit a transverse movement in some other manner that appears appropriate to a person skilled in the art, for example by means of a magnetic force etc. The expression "to largely secure against a transverse movement relative to a further cutter carrier element of the cutting strand in a mounted state of the cutter carrier element" should be understood here as meaning in particular limiting a movement of the cutter carrier elements, connected together by means of at least one connecting element, relative to one another by means of the transverse securing element along a movement path that extends at least substantially perpendicularly to a cutting plane of the cutting strand. In this case, the movement path of the cutter carrier elements relative to one another is limited in particular by means of the transverse securing element to a value of less than 5 mm, preferably less than 2 mm and particularly preferably less than 1 mm. By means of the method according to the disclosure, a securing function that can be produced in a cost-effective manner can advantageously be realized on the cutter carrier element.

Furthermore, the disclosure is based on the cutting strand segment of the cutting strand of the power-tool parting device, said cutting strand segment being obtainable by means of the method according to the disclosure. The cutting strand segment is in particular in the form of a chain link of a cutting strand in the form of a cutting chain. In this case, the cutting strand can be in the form of an individual-link cutting chain, in which individual cutting strand segments are connected directly together. However, the cutting strand can also be in the form of a multi-link cutting chain, in which at least two cutting strand segments together form a chain link and are connected by means of a drive link to further cutting strand segments that form a chain link. Depending on the application field, a person skilled in the art will select a configuration of the cutting strand that appears appropriate for the range of applications. The cutting strand segment comprises the cutter carrier element and the cutting element, which are formed integrally. However, it is also conceivable for the cutting element to be formed separately from the cutter carrier element and to be arranged on the cutter carrier element by means of a form-fitting, force-fitting and/or cohesive connection. Preferably, the cutting strand segment is formed in a manner decoupled from a cutting-depth limiting element. Advantageously, a compact and robust cutting strand segment can be realized.

Particularly preferably, it is proposed that the cutting element has a varying set relative to the outer surface of the cutter carrier element in the cutting direction. However, it is also conceivable for the cutting element to have a regular or constant set relative to the outer surface of the cutter carrier element in the cutting direction. A "set" should be understood here as meaning in particular an inclination of a center axis of the cutting element and/or of a lateral surface, extending at least substantially parallel to a cutting edge of the cutting element, of the cutting element relative to a reference surface, in particular the outer surface of the cutter carrier element, about at least one axis. Preferably, the lateral surface of the cutting element is inclined relative to the outer surface about an axis extending at least substantially parallel to the outer surface. Preferably, the cutting element, in particular the lateral face of the cutting element, has a set angle, in particular inclination angle, relative to the outer surface that varies in the cutting direction. In particular, a maximum inclination angle relative to the outer surface is less than 15°, preferably less than 8° and particularly preferably less than 5°. Particularly preferably, the cutting element is arranged on the cutter carrier element in a manner inclined relative to the outer surface of the cutter carrier element about two axes that extend at least substantially perpendicularly. The two axes that extend at least substantially perpendicularly in this case preferably extend at least substantially parallel to the outer surface of the cutter carrier element and/or to the cutting plane of the cutting strand. The expression "substantially perpendicularly" is intended to define here in particular an orientation of a direction relative to a reference direction, wherein the direction and the reference direction, in particular as seen in a plane, enclose an angle of 90° and the angle has a maximum deviation of in particular less than 8°, advantageously less than 5° and particularly advantageously less than 2°. Advantageously, by means of the configuration according to the disclosure, a mechanical property of the cutting element can be positively influenced. Furthermore, a stable attachment of the cutting element to the cutter carrier element can advantageously be achieved.

In addition, it is proposed that the cutting strand segment comprises at least one further cutting element which is arranged on the cutter carrier element in an at least partially set manner relative to the outer surface of the cutter carrier element. In this case, the further cutting element is formed in particular integrally with the cutter carrier element. Preferably, the further cutter carrier element has a different set than the cutter carrier element relative to the outer surface of the cutter carrier element. The individual cutting elements can advantageously be adapted to different machining operations. Thus, a precise work result can be achieved when a workpiece is machined by means of the cutting strand segment.

Advantageously, the cutting element and the further cutting element are arranged in an undulating manner on the cutter carrier element in the cutting direction. Preferably, on account of the undulating arrangement of the cutting element and of the further cutting element of each individual cutter carrier element, the cutting strand has a sinusoidal profile of cutting elements in the cutting direction. In this case, the cutting element and the further cutting element can be arranged on the cutter carrier element in a set manner in particular in opposite directions relative to the outer surface. In addition, the cutting element and the further cutting element can be set in particular in one direction, wherein the cutting element and the further cutting element are at different set angles relative to the outer surface of the cutter carrier element. Advantageously, by means of the configuration according to the disclosure, a plurality of functional parts can be realized on one cutter carrier element.

Furthermore, the disclosure is based on a power-tool parting device having at least one guide unit and having at least one cutting strand which has at least one cutting strand segment produced by means of the method according to the disclosure. The guide unit is provided preferably for guiding the cutting strand. A "guide unit" should be understood here as meaning in particular a unit which is intended to exert on the cutting strand a constraining force at least in a direction perpendicular to a cutting direction of the cutting strand, in order to specify a movement capability of the cutting strand in the cutting direction. Preferably, the guide unit has at least one guide element, in particular a guide groove, through which the cutting strand is guided. Preferably, the cutting strand, as seen in a cutting plane, is guided through the guide unit around a full circumference of the guide unit by means of the guide element, in particular the guide groove. The expression "closed system" is intended to define here in particular a system which comprises at least two components which retain functionality by means of interaction in a state in which the system is dismounted from a system superordinate to the system, for example a power tool, and/or which are connected captively together in the dismounted state. Preferably, the at least two components of the closed system are connected together at least substantially in a non-detachable manner for an operator. The expression "at least substantially in a non-detachable manner" should be understood here as meaning in particular a connection of at least two components which can be parted from one another only with the aid of parting tools, for example a saw, in particular a mechanical saw etc., and/or chemical parting means, for example solvents etc. By means of the configuration according to the disclosure of the power-tool parting device, a versatile tool for machining workpieces can advantageously be achieved.

In addition, the disclosure is based on a portable power tool having at least one coupling device which is couplable in a form-fitting and/or force-fitting manner to a power-tool parting device according to the disclosure. A "portable power tool" should be understood here as meaning in particular a power tool, in particular a handheld power tool, which can be transported by an operator without the use of a transport machine. The portable power tool has in particular a mass which is less than 40 kg, preferably less than 10 kg and particularly preferably less than 5 kg. A portable power tool which is suitable in a particularly advantageous manner for a broad range of applications can advantageously be achieved.

In this case, the power-tool parting device according to the disclosure and/or the portable power tool according to the disclosure is not intended to be limited to the above-described application and embodiment. In particular, the power-tool parting device according to the disclosure and/or the portable power tool according to the disclosure can have a number of individual elements, components and units which differs from the number mentioned herein in order to fulfill a functionality described herein.

BRIEF DESCRIPTION OF THE DRAWINGS

Further advantages can be gathered from the following description of the drawing. Exemplary embodiments of the disclosure are illustrated in the drawing. The drawing and the description contain numerous features in combination. A person skilled in the art will expediently also consider the features individually and combine them to form appropriate further combinations.

In the drawing.

DETAILED DESCRIPTION

Figure 1:
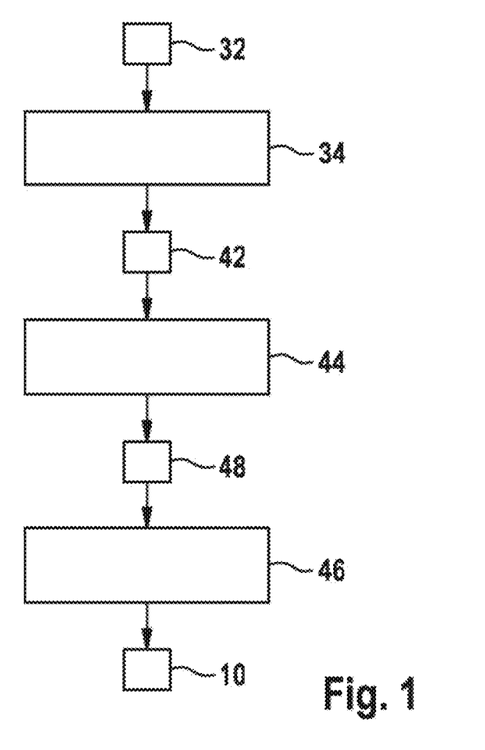
FIG. 1 shows a schematic illustration of a diagram of a sequence of a method according to the disclosure for producing at least one cutting strand segment of a cutting strand.

FIG. 1 shows a schematic sequence of a method for producing at least one cutting strand segment 10 of a cutting strand 12 (provided with letters a to c in FIGS. 2 to 7), said cutting strand segment 10 comprising at least one cutting element 18 and a cutter carrier element 16 (provided with letters a to c in FIGS. 3 to 7). In a first step, the cutting strand segment 10 is punched from a band material 32. However, it is also conceivable for the cutting strand segment 10 to be lasered out of the band material 32, be cut out by means of a water jet or be cut out by means of a removal and forming method, for example by erosion, milling etc. In this case, a bimetal is used as the band material 32. In an alternative embodiment of the method, a hard metal is used as the band material 32. However, it is also conceivable for some other material that appears appropriate to a person skilled in the art and is suitable for a punching operation to be used as the band material 32. The band material 32 is fed to a punching device 34 in a manner already known to a person skilled in the art by means of a rolling device (not illustrated in more detail here).

By means of the punching device 34, the cutting strand segment 10 is punched out of the band material 32. In this way, the cutting element 18 and the cutter carrier element 16 are punched out of the band material 32 during one method step. However, it is also conceivable for a plurality of cutting elements to be integrally formed on the cutter carrier element 16 by means of the punching device 34. Furthermore, a connecting element 36 (provided with letters a to c in FIGS. 4, 6 and 7) of the cutting strand 12 is likewise already integrally formed on the cutter carrier element 16 during punching by means of forming by interaction of a die and a punch of the punching device 34. In addition, by means of the interaction of the die and the punch, a connecting cutout 76 (provided with letters a to c in FIGS. 4, 6 and 7) of the cutting strand segment 10 is integrally formed on the cutter carrier element 16 or introduced into the cutter carrier element 16. However, it is also conceivable for the connecting element 36 to be embossed into the cutter carrier element 16 after the punching operation by means of a connecting element embossing die (not illustrated in more detail here). Furthermore, by means of the interaction of the die and the punch, a segment guide element 40 (provided with letters a to c in FIGS. 4, 6 and 7) of the cutting strand segment 10 is integrally formed on the cutter carrier element 16. However, it is also conceivable for further functional elements, for example a transverse securing region, a transverse securing element etc., to additionally be integrally formed on the cutting strand segment 10 by means of the interaction of the die and the punch.

In a further step, the cutting strand segment 10 is subjected to a tensile forming operation. In this case, the cutting strand segment 10 is fed in the form of a punched blank 42 to a tensile forming device 44. By means of the tensile forming device 44, the cutting element 18 is integrally formed on the cutter carrier element 16 in an at least partially set manner relative to an outer surface 20 (provided with letters a to c in FIGS. 4, 6 and 7) of the cutter carrier element 16 by tensile forming. In this case, material in the region of the cutting element 18 is set relative to the outer surface 20 by the tensile forming device 44. In this case, the cutting element 18 is integrally formed on the cutter carrier element 16 in an at least partially set manner relative to the outer surface 20 of the cutter carrier element 16 by embossing. However, it is also conceivable for the cutting strand segment 10 only to be fed to the tensile forming device 44 at a later point in the method, in order to set the cutting element 18 relative to the outer surface 20. In addition, in at least one step, a transverse securing element 22 (provided with letters a to c in FIGS. 4, 6 and 7) is integrally formed on the cutter carrier element 16 by tensile forming in the tensile forming device 44. In this case, it is conceivable for the transverse securing element 22 to be embossed into the cutter carrier element 16 of the cutting strand segment 10 by means of a further embossing die (not illustrated in more detail here) only after production of the cutting strand segment 10 and after the mounting of further cutting strand segments in order to form the cutting strand 12.

Furthermore, in a further step, the cutting strand segment 10 is fed to a finishing device 46 in order to feed the cutting strand segment 10 to a finishing process. In this case, the cutting strand segment 10 is fed as an embossed blank 48 to the finishing device 46. In the finishing device 46, a coating is applied to the cutting strand segment 10 at least in a subregion of the cutting strand segment 10. The subregion of the cutting strand segment 10 is formed by the cutting element 18. In this case, the cutting strand segment 10 having the cutting element 18 is guided through an immersion bath unit (not illustrated in more detail here) of the finishing device 46. In the immersion bath unit, the cutting element 18 is coated at least partially with a solder. However, it is also conceivable for the cutting element 18 to be coated with a solder by means of an application unit of the finishing device 46. In a further step, in the finishing device 46, that subregion of the cutting strand segment 10 that is provided with the coating is furnished with particles. In this case, the particles are furnished with particles either by means of passing through a further immersion bath or by means of particles being pressed onto that subregion of the cutting strand segment 10 that is provided with the coating. The particles are in the form of diamond particles, hard-metal particles or ceramic particles. However, it is also conceivable, as an alternative to the immersion bath, for the cutting strand segment 10 to be coated, at least in a subregion, by means of a chemical vapor deposition unit (not illustrated in more detail here) of the finishing device 46. Other methods that appear appropriate to a person skilled in the art for coating the cutting element 18 of the cutting strand segment 10 by means of the finishing device 46 are likewise conceivable, for example by means of a physical vapor deposition method (PVD method) or by means of a plasma assisted chemical vapor deposition method (PACVD method) etc. After a finishing operation by means of the finishing device 46, the cutting strand segment 10 is in the form of a finished part which is connected to further cutting strand segments (not illustrated in more detail here) in a further working process in order to form the cutting strand 12. In this case, the individual cutting strand segments are fed to a mounting device in which the individual cutting strand segments are connected together. It is conceivable for transverse securing elements to be integrally formed on the cutting strand segments by means of the further embossing device (not illustrated in more detail here) following mounting, said transverse securing elements being intended to largely prevent a transverse movement of the individual cutting strand segments in a direction extending at least substantially perpendicularly to a cutting plane of the cutting strand 12.

FIGS. 2 to 9 illustrate various exemplary embodiments of cutting strand segments which are produced by means of the above-described method. In this case, in order to distinguish between the exemplary embodiments, the letters a to d have been added to the reference signs of the exemplary embodiments. The following description of the exemplary embodiments is limited substantially to the differences in the geometric configuration of the cutting strand segments, produced by means of the method, of the exemplary embodiments.

Figure 2:
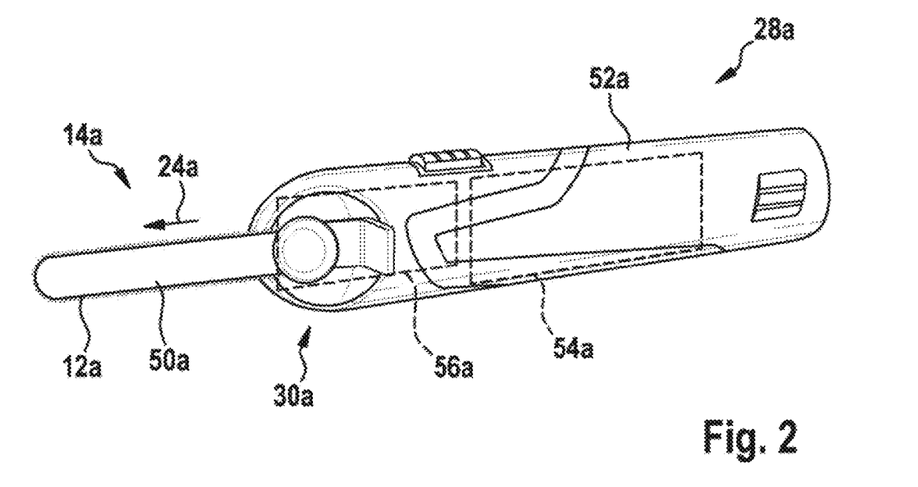
FIG. 2 shows a schematic illustration of a portable power tool according to the disclosure having a power-tool parting device according to the disclosure.

FIG. 2 shows a portable power tool 28*a* having a power-tool parting device 14*a* which together form a power-tool system. The power-tool parting device 14*a* comprises a cutting strand 12*a*, which has at least one cutting strand segment 10*a* (FIG. 4) produced by means of the above-described method, and a guide unit 50*a* for guiding the cutting strand 12*a*. The portable power tool 28*a* has a coupling device 30*a* for coupling the power-tool parting device 14*a* in a form-fitting and/or force-fitting manner. The coupling device 30*a* can in this case be in the form of a bayonet closure and/or of some other coupling device that appears appropriate to a person skilled in the art. Furthermore, the portable power tool 28*a* has a power-tool housing 52*a* which encloses a drive unit 54*a* and a transmission unit 56*a* of the portable power tool 28*a*. The drive unit 54*a* and the transmission unit 56*a* are operatively connected together in a manner already known to a person skilled in the art in order to produce a drive moment that is transmissible to the power-tool parting device 14*a*. The transmission unit 56*a* is in the form of an angular gear. The drive unit 54*a* is in the form of an electric motor unit. However, it is also conceivable for the drive unit 54*a* and/or the transmission unit 56*a* to have some other configuration that appears appropriate to a person skilled in the art. The drive unit 54*a* is intended to drive the cutting strand 12*a* of the power-tool parting device 14*a* in at least one operating state via the transmission unit 56*a*. In this case, the cutting strand 12*a* is moved in the guide unit 50*a* of the power-tool parting device 14*a* in a cutting direction 24*a* of the cutting strand 12*a* in the guide unit 50*a*.

Figure 3:
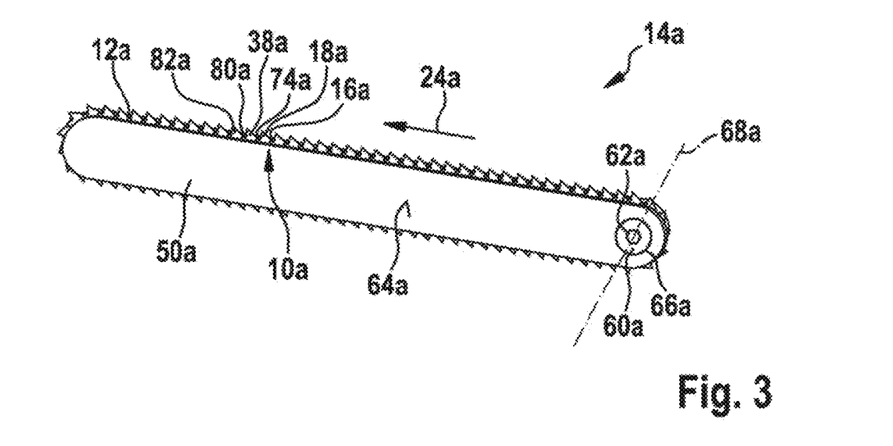
FIG. 3 shows a schematic illustration of a detail view of the power-tool parting device according to the disclosure.

FIG. 3 shows the power-tool parting device 14*a* in a state decoupled from the coupling device 30*a* of the portable power tool 28*a*. The power-tool parting device 14*a* has the cutting strand 12*a* and the guide unit 50*a*, which together form a closed system. The cutting strand 12*a* is guided by means of the guide unit 50*a*. To this end, the guide unit 50*a* has at least one guide element (not illustrated in more detail here) in the form of a guide groove, by means of which the cutting strand 12*a* is guided. In this case, the cutting strand 12*a* is guided by means of peripheral regions, adjoining the guide groove, of the guide unit 50*a*. However, it is also conceivable for the guide element to be configured in some other manner which appears appropriate to a person skilled in the art, for example as a rib-like formation on the guide unit 50a, said rib-like formation engaging in a cutout on the cutting strand 12a. The cutting strand 12a comprises overall a multiplicity of connected-together cutting strand segments 10a.

In order to drive the cutting strand 12a, the power-tool parting device 14a or the portable power tool 28a has a torque transmission element 60a which is connectable to the drive unit 54a and/or the transmission unit 56a in order to transmit forces and/or torques to the cutting strand 12a. In one configuration of the portable power tool 28a having the torque transmission element (not illustrated in more detail here), the torque transmission element is connected to the cutting strand 12a during coupling of the power-tool parting device 14a and the coupling device 30a. In one configuration of the power-tool parting device 14a having the torque transmission element 60a, the torque transmission element 60a and the cutting strand 12a are in engagement even after decoupling from the coupling device 30a. For coupling the torque transmission element 60a, formed with the power-tool parting device 14a, and the drive unit 54a and/or the transmission unit 56a, the torque transmission element 60a has a coupling cutout 62a into which a pinion (not illustrated in more detail here) of the drive unit 54a and/or a gear wheel (not illustrated in more detail here) and/or a toothed shaft (not illustrated in more detail here) of the transmission unit 56a engages in a mounted state. The coupling cutout 62a is arranged concentrically in the torque transmission element 60a. Furthermore, the torque transmission element 60a is in the form of a gear wheel. The torque transmission element 60a is mounted at least partially in the guide unit 50a. In this case, the torque transmission element 60a is arranged, as seen in a direction perpendicular to the cutting plane, at least partially between outer surfaces 64a of the guide unit 50a in a cutout 66a in the guide unit 50a. Furthermore, the torque transmission element 60a is mounted in the guide unit 50a in a rotatable manner about a rotation axis 68a.

Figure 4:
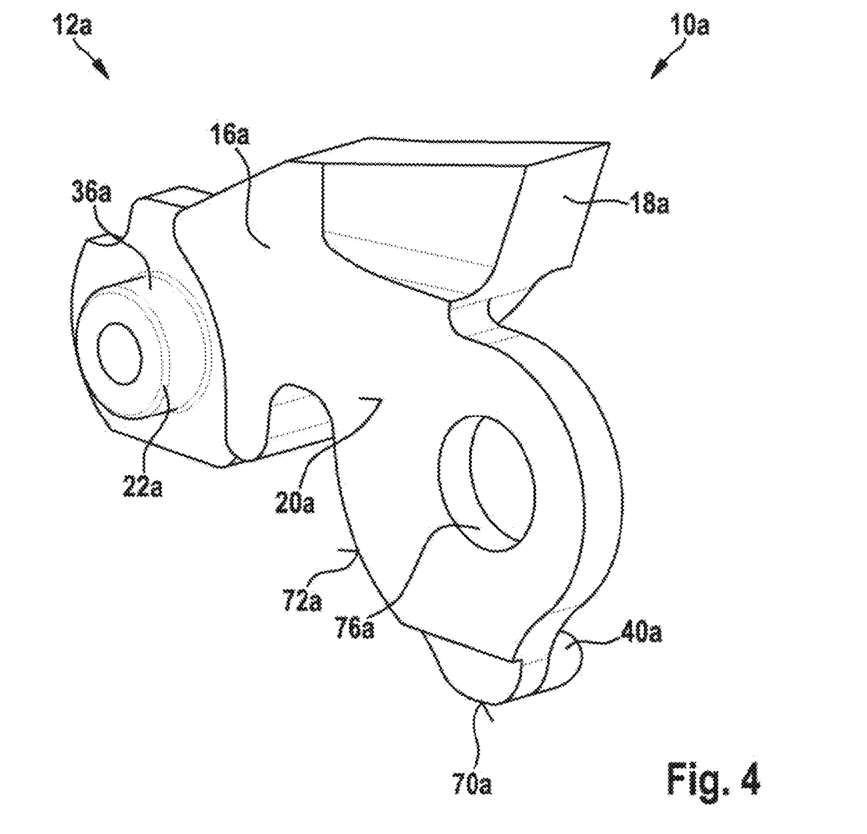
FIG. 4 shows a schematic illustration of a detail view of a cutting strand segment of a cutting strand of the power-tool parting device according to the disclosure.

FIG. 4 shows a detail view of the cutting strand segment 10a of the cutting strand 12a of the power-tool parting device 14a. The cutting strand segment 10a comprises at least the cutter carrier element 16a and at least the cutting element 18a. The cutter carrier element 16a and the cutting element 18a are formed integrally. However, it is also conceivable for the cutting element 18a to be punched in a separate step and be arranged on the cutter carrier element 16a in a further step by means of a form-fitting, a force-fitting and/or by means of a cohesive connection. The cutting element 18a has in this case a cutting layer having at least titanium carbide. The cutting layer is applied to the cutting element 18a by means of a CVD method. However, it is also conceivable for the cutting layer alternatively or additionally to comprise a different material, for example titanium nitride, titanium carbonitride, aluminum oxide, titanium aluminum nitride, chromium nitride or zirconium carbonitride. In addition, it is also conceivable for the cutting layer to be applied by means of some other method that appears appropriate to a person skilled in the art, for example by means of a PVD or PACVD method.

Furthermore, the cutting element 18a has a varying set relative to the outer surface 20a of the cutter carrier element 16a in the cutting direction 24a. In this case, the cutting element 18a is arranged on the cutter carrier element 16a in a manner inclined relative to the outer surface 20a relative to the cutter carrier element 16a about two axes that extend at least substantially perpendicularly. The two axes that extend at least substantially perpendicularly in this case preferably extend at least substantially parallel to the outer surface 20a of the cutter carrier element 16a and/or to the cutting plane of the cutting strand 12a.

The cutter carrier element 16a has at least one segment guide element 40a which is intended to limit a movement of the cutter carrier element 16a, as seen in a state arranged in the guide unit 50a in a direction away from the guide unit 50a, at least in the direction extending at least substantially parallel to the cutting plane of the cutting strand 12a. The segment guide element 40a is formed by a transverse extension which extends at least substantially perpendicularly to the cutting plane of the cutting strand 12a. In this case, the segment guide element 40a delimits a longitudinal groove. For the purpose of limiting movement, the segment guide element 40a is intended to interact with the segment counter-guide elements (not illustrated in more detail here) that are arranged on the inner wall, facing the cutter carrier element 16a, of the guide unit 50a and are in the form of a rib or punched-out section. The segment counter-guide elements are formed in a manner corresponding to the segment guide element 40a.

In addition, the cutter carrier element 16a has a compressive-force transmission surface 70a. The compressive-force transmission surface 70a is intended to support compressive forces which act on the cutting strand 12a when a workpiece (not illustrated in more detail here) is machined, by means of interaction with a compressive-force absorbing region (not illustrated in more detail here) of the guide unit 50a. The compressive-force absorbing region of the guide unit 50a is in this case arranged, as seen in a direction extending at least substantially perpendicularly to the cutting plane of the cutting strand 12a, between the outer surfaces 64a of the guide unit 50a, said outer surfaces 64a extending at least substantially parallel to one another.

The cutter carrier element 16a furthermore has a drive surface 72a which is intended to interact with drive surfaces of the torque transmission element 60a in order to drive the cutting strand 12a. The drive surfaces of the torque transmission element 60a are in this case in the form of tooth flanks. The drive surface 72a of the cutter carrier element 16a is in this case formed in a manner corresponding to the drive surfaces of the torque transmission element 60a. When the cutting strand 12a is driven, the tooth flanks of the torque transmission element 60a bear temporarily against the drive surface 72a in order to transmit drive forces.

Furthermore, the cutting strand 12a has at least one connecting element 36a which is formed integrally with the cutter carrier element 16a. The connecting element 36a is formed in a pin-like manner. In this case, the connecting element 36a is intended to realize, by means of interaction with a connecting cutout of a further cutter carrier element 74a (FIG. 5) of the cutting strand 12a, a form-fitting connection between the cutter carrier element 16a and the further cutter carrier element 74a. The cutter carrier element 16a likewise comprises a connecting cutout 76a in which a further connecting element (not illustrated in more detail here) of the cutting strand 12a is arrangeable in order to form the cutting strand 12a. Thus, each cutter carrier element of the cutting strand 12a comprises at least one connecting element and at least one connecting cutout. The connecting element 36a terminates at least substantially flush with the outer surface 20a of the cutter carrier element 16a. However, it is also conceivable for the connecting element 36a, as seen in a direction extending at least substantially perpendicularly to the outer surface 20a, to project beyond the outer surface 20a. In this case, the cutter carrier element 16a can be guided, in a state arranged in the guide groove, over the connecting element 36a in peripheral regions of the guide groove. Thus, the cutter carrier elements are mounted pivotably relative to one another by means of interaction of the connecting elements and the connecting cutouts.

Furthermore, the cutter carrier element 16a has at least one transverse securing element 22a which is intended to largely secure the cutter carrier element 16a, in a mounted state, against moving transversely relative to the further cutter carrier element 74a of the cutting strand 12a. The transverse securing element 22a is arranged on the connecting element 36a. In this case, the transverse securing element 22a has at least one securing region which extends at least substantially parallel to a cutting plane of the cutting strand 12a. Thus, the securing region extends at least substantially parallel to the outer surface 20a of the cutter carrier element 16a. The transverse securing element 22a, following coupling of at least the cutter carrier element 16a to the further cutter carrier element 74a of the cutting strand 12a, is embossed into the connecting element 36a of the cutting strand 12a by means of an embossing die. Thus, the securing region is formed as a result of the embossing of the transverse securing element 22a.

Figure 5:
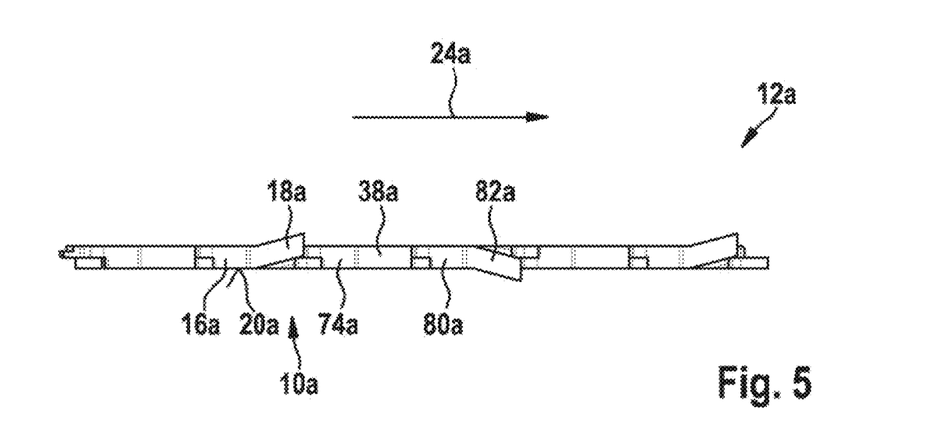
FIG. 5 shows a schematic illustration of a detail view of an arrangement of cutting strand segments of the cutting strand from FIG. 4 within the cutting strand.

FIG. 5 shows the cutting strand 12a following coupling at least of the cutter carrier element 16a and of the further cutter carrier element 74a, and following embossing of the transverse securing element 22a. Thus, after coupling, the cutter carrier element 16a and the further cutter carrier element 74a are connected non-detachably together, without the use of parting tools, in at least two opposite directions that extend at least substantially perpendicularly to the cutting plane. A further non-set cutting element 38a is integrally formed on the further cutter carrier element 74a. As seen in the cutting direction 24a, the further cutter carrier element 74a is followed by a further first cutter carrier element 80a on which a further set cutting element 82a that is formed integrally with the further first cutter carrier element 80a is arranged. The cutting element 18a has in this case, compared with a set with respect to the further set cutting element 82a of the further first cutter carrier element 80a, a set in a direction oriented in the opposite direction. Thus, the cutting strand has the following order of cutter carrier elements: L (cutter carrier element 16a), M (further cutter carrier element 74a), R (further first cutter carrier element 80a) and M (further cutter carrier element 74a). This order of cutter carrier elements repeats in the cutting direction 24a along the entire circumference of the cutting strand 12a. However, it is also conceivable for the cutting strand 12a to have some other arrangement of cutter carrier elements of the cutting strand 12a along the circumference of the cutting strand 12a that appears appropriate to a person skilled in the art, for example [L, R]; [L, L, M, M, R, R, M, M]; [L, L, R, R], etc.

Figure 6:
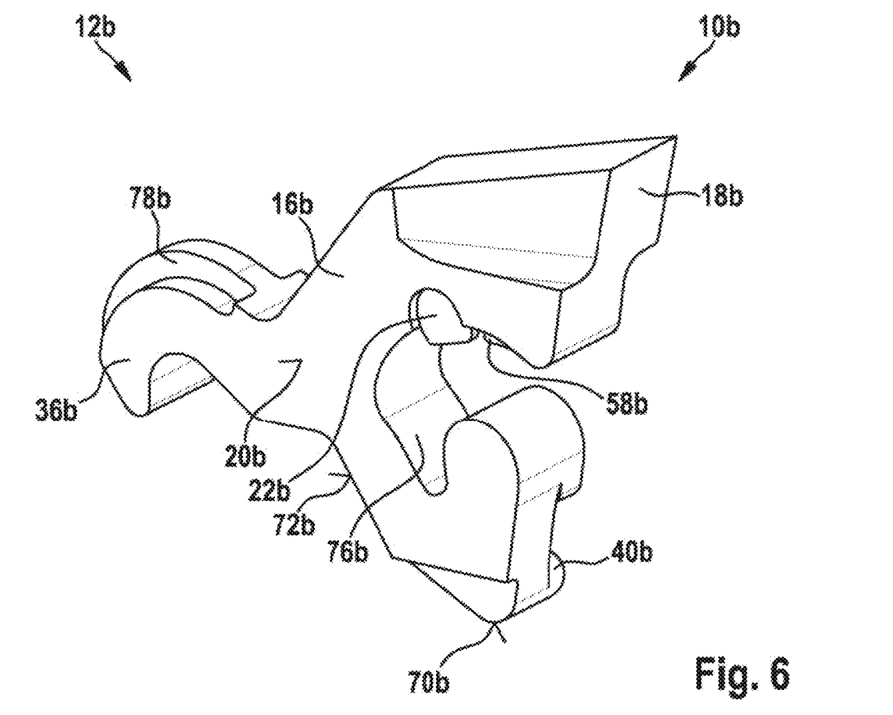
FIG. 6 shows a schematic illustration of a detail view of an alternative cutting strand segment of an alternative cutting strand.
Figure 7:
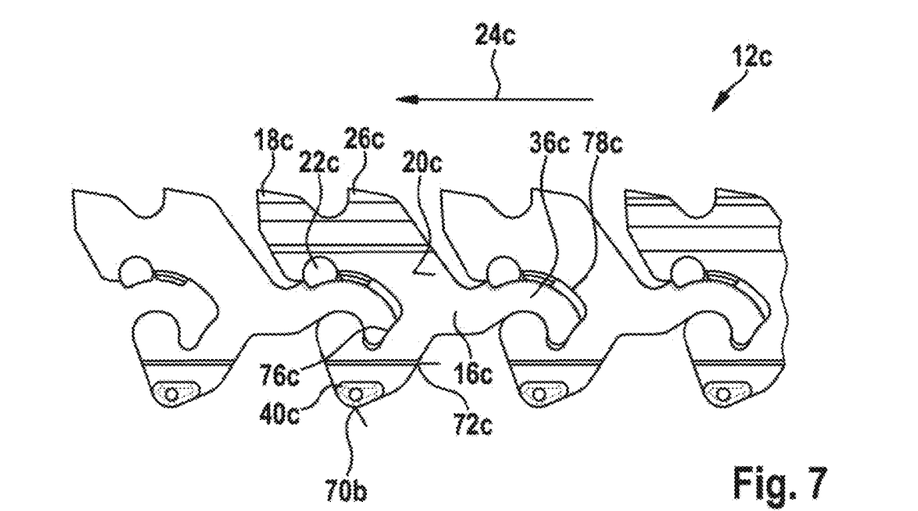
FIG. 7 shows a schematic illustration of a detail view of a further, alternative cutting strand segment of a cutting strand.

FIGS. 6 and 7 illustrate alternative exemplary embodiments. Substantially identical components, features and functions are designated in principle with the same reference signs. The following description is limited substantially to the differences with respect to the first exemplary embodiment described in FIGS. 2 to 5, it being possible to refer to the description of the first exemplary embodiment in FIGS. 2 to 5 with regard to identical components, features and functions.

FIG. 6 shows an alternative cutting strand segment 10b of a cutting strand 12b. The cutting strand segment 10b comprises a cutter carrier element 16b and a cutting element 18b. The cutting element 18b has a varying set relative to an outer surface 20b of the cutter carrier element 16b in a cutting direction 24b of the cutting strand 12b. In order to form the cutting strand 12b, the cutter carrier element 16b comprises at least one connecting element 36b. The connecting element 36b is formed integrally with the cutter carrier element 16b. In this case, the connecting element 36b is in the form of a longitudinal extension of the cutter carrier element 16b. The longitudinal extension is formed in a hook-like manner. In this case, the longitudinal extension is formed in a manner deviating from a rod-like extension on which a circular form-fitting element is integrally formed and/or in a manner deviating from a semicircular extension.

Furthermore, the connecting element 36b in the form of a longitudinal extension has a transverse securing region 78b on one side. The transverse securing region 78b is intended to at least largely prevent a transverse movement of the cutter carrier element 16b in at least two oppositely directed directions in a coupled state relative to the further cutter carrier element, by means of interaction with at least one transverse securing element of a further cutter carrier element (not illustrated in more detail here), connected to the cutter carrier element 16b, of the cutting strand 12b. In this case, the transverse securing region 78b is in the form of a rib. However, it is also conceivable for the transverse securing region 78b to have some other configuration that appears appropriate to a person skilled in the art, for example a configuration as a groove etc. The transverse securing region 78b is arranged on a side, facing the cutting element 18b formed integrally with the cutter carrier element 16b, of the connecting element 36b.

Furthermore, the cutter carrier element 16b has two transverse securing elements 22b, 58b which are intended to interact, in a state of the cutter carrier element 16b in which it is coupled to the further cutter carrier element, with a transverse securing region of the further cutter carrier element. The transverse securing elements 22b, 58b are arranged in each case in a peripheral region of the cutter carrier element 16b, said peripheral region bounding a connecting cutout 76b of the cutter carrier element 16b. In this case, the transverse securing elements 22b, 58b are formed integrally with the cutter carrier element 16b. The transverse securing elements 22b, 58b are in each case integrally formed on the cutter carrier element 16b by means of an embossing method.

FIG. 7 shows a further alternative cutting strand 12c which has at least one cutting strand segment 10c. The cutting strand segment 10c has a configuration at least substantially analogous to the cutting strand segment 10b from FIG. 6. In contrast to the cutting strand segment 10b from FIG. 6, the cutting strand segment 10c from FIG. 7 has a cutting element 18c and a further cutting element 26c which are formed integrally with a cutter carrier element 16c of the cutting strand segment 10c. The cutting element 18c has a varying set relative to an outer surface 20c of the cutter carrier element 16c in a cutting direction 24c of the cutting strand 12c. In addition, the further cutting element 26c is likewise arranged on the cutter carrier element 16c in an at least partially set manner relative to the outer surface 20c of the cutter carrier element 16c. In this case, the cutting element 18c and the further cutting element 26c are arranged in an undulating manner on the cutter carrier element 16c in the cutting direction 24c. The cutting element 18c and the further cutting element 26c thus have a different set from one another on the cutter carrier element 16c. In this case, it is conceivable for the cutting strand 12c to have further cutting strand segments which have an undulating arrangement that differs from the undulating arrangement of the cutting element 18c and the further cutting element 26c. This results, as seen in the cutting direction 24c, in an alternating undulating arrangement of cutting elements along the entire circumference of the cutting strand 12c. In this case, the undulating arrangement of cutting elements has a sinusoidal configuration (not illustrated in more detail here) in the cutting direction 24c.

The invention claimed is:

1. A method for producing a cutting strand segment of a cutting strand of a power-tool parting device, the method comprising:
   integrally forming at least one cutting element on at least one cutter carrier element with a set relative to an outer surface of the at least one cutter carrier element by tensile forming;
   forming a connecting cutout in a first surface of a first region of the cutter carrier element;
   integrally forming a connecting element extending from a second surface of a second region of the cutter carrier element in such a way that the connecting element has a third surface, which is coplanar with the first surface; and
   embossing the connecting element so as to integrally form a transverse securing element on the connecting element in such a way that the transverse securing element couples the cutting strand to a further cutting strand segment and secures the cutting strand segment against movement relative to the further cutting strand segment.

2. The method as claimed in claim 1, wherein the integral forming of the at least one cutter carrier element includes embossing the at least one cutting element with the set relative to the outer surface of the at least one cutter carrier element.

3. The method as claimed in claim 1, further comprising:
   punching the cutting strand segment from a band material before integrally forming the cutting element to form the cutter carrier element.

4. A cutting strand of a power-tool parting device comprising:
   a first cutter carrier element;
   a first cutting element integrally formed on the first cutter carrier element with a first set relative to an outer surface of the first cutter carrier element by tensile forming;
   a second cutter carrier element offset along a cutting direction from the first cutter carrier element; and
   a second cutting element integrally formed on the second cutter carrier element, wherein:
   the first cutter carrier element includes a first region having a first surface, a first connecting cutout being defined in the first region in the first surface,
   the first cutter carrier element includes a second region having a second surface parallel to and recessed from the first surface, the second region including a first connecting element extending integrally from the second surface so as to form a third surface, which is coplanar with the first surface,
   the second cutter carrier element includes a third region having a fourth surface, a second connecting cutout being defined in the third region in the fourth surface,
   the second cutter carrier element includes a fourth region having a fifth surface parallel to and recessed from the fourth surface, the fourth region including a second connecting element extending from the fifth surface so as to form a sixth surface, which is coplanar with the first surface and the fourth surface,
   the first connecting element interacts with the second connecting cutout so as to pivotably mount the first and second cutter carrier elements relative to one another, and
   the fourth, fifth, and sixth surfaces, the third and fourth regions, and the second connecting element are all formed integrally with one another.

5. The cutting strand according to claim 4, wherein a transverse securing element is integrally formed on the first cutter carrier element, the transverse securing element interacting with the second cutter carrier element to secure a movement of the first cutter carrier element along a transverse axis.

6. The cutting strand as claimed in claim 5, wherein the transverse securing element is formed on the first connecting element.

7. The cutting strand according to claim 4, wherein the first connecting element extends in a direction at least substantially perpendicular to the second surface.

* * * * *